United States Patent
Chou et al.

(10) Patent No.: US 7,290,277 B1
(45) Date of Patent: Oct. 30, 2007

(54) CONTROL OF AUTHENTICATION DATA RESIDING IN A NETWORK DEVICE

(75) Inventors: Norman C. Chou, San Jose, CA (US); Olivier Cremel, Palo Alto, CA (US)

(73) Assignee: Avago Technologies General IP PTE Ltd (SG)

(*) Notice: Subject to any disclaimer, the term of this patent is extended or adjusted under 35 U.S.C. 154(b) by 859 days.

(21) Appl. No.: 10/057,159

(22) Filed: Jan. 24, 2002

(51) Int. Cl.
*H04L 9/32* (2006.01)

(52) U.S. Cl. .......................................... 726/3; 713/152

(58) Field of Classification Search ................ 713/200; 726/3
See application file for complete search history.

(56) References Cited

U.S. PATENT DOCUMENTS

| | | | |
|---|---|---|---|
| 5,745,701 A * | 4/1998 | Nguyen-Thai et al. ...... | 709/249 |
| 5,768,623 A * | 6/1998 | Judd et al. .................... | 710/37 |
| 5,892,766 A * | 4/1999 | Wicki et al. ................ | 370/412 |
| 5,959,995 A * | 9/1999 | Wicki et al. ................ | 370/400 |
| 6,128,750 A * | 10/2000 | Espy et al. ..................... | 714/7 |
| 6,233,702 B1 * | 5/2001 | Horst et al. ................... | 714/48 |
| 6,347,337 B1 * | 2/2002 | Shah et al. ................. | 709/224 |
| 6,438,130 B1 * | 8/2002 | Kagan et al. ............... | 370/392 |
| 6,591,310 B1 * | 7/2003 | Johnson ........................ | 710/3 |
| 6,594,712 B1 * | 7/2003 | Pettey et al. ................. | 710/22 |
| 6,601,148 B2 * | 7/2003 | Beukema et al. ........... | 711/153 |
| 6,665,780 B1 * | 12/2003 | Bradley ...................... | 711/162 |
| 6,704,812 B2 * | 3/2004 | Bakke et al. ................. | 710/38 |
| 6,725,388 B1 * | 4/2004 | Susnow ....................... | 713/400 |
| 6,747,997 B1 * | 6/2004 | Susnow et al. ............. | 370/509 |
| 6,772,320 B1 * | 8/2004 | Raj ............................ | 712/225 |
| 6,789,143 B2 * | 9/2004 | Craddock et al. ............ | 710/54 |
| 6,816,889 B1 * | 11/2004 | Graham ...................... | 709/213 |
| 6,877,044 B2 * | 4/2005 | Lo et al. ......................... | 710/2 |
| 6,912,604 B1 * | 6/2005 | Tzeng et al. .................. | 710/52 |
| 6,944,152 B1 * | 9/2005 | Heil ........................... | 370/360 |
| 6,976,134 B1 * | 12/2005 | Lolayekar et al. .......... | 711/148 |
| 6,980,510 B1 * | 12/2005 | Deitz et al. ................. | 370/217 |
| 6,980,551 B2 * | 12/2005 | Pfister et al. ............... | 370/392 |
| 6,981,086 B2 * | 12/2005 | Wetzel et al. ............... | 710/300 |
| 6,983,303 B2 * | 1/2006 | Pellegrino et al. .......... | 709/203 |
| 6,985,956 B2 * | 1/2006 | Luke et al. ................. | 709/229 |
| 6,988,161 B2 * | 1/2006 | McConnell et al. ........ | 710/316 |
| 6,993,032 B1 * | 1/2006 | Dammann et al. ....... | 370/395.7 |
| 7,000,043 B2 * | 2/2006 | Finch .......................... | 710/104 |
| 7,002,926 B1 * | 2/2006 | Eneboe et al. .............. | 370/255 |
| 2002/0026502 A1 * | 2/2002 | Phillips et al. .............. | 709/219 |
| 2002/0065962 A1 * | 5/2002 | Bakke et al. ................. | 710/38 |
| 2002/0073257 A1 * | 6/2002 | Beukema et al. ........... | 710/105 |

(Continued)

OTHER PUBLICATIONS

IBM, IBM plans InfiniBand chips to link servers for higher performance, resource sharing, Jun. 20, 2000, < http://web.archive.org/web/20010428224222/www.chips.ibm.com/news/2000/000620/>.*

(Continued)

*Primary Examiner*—Nasser Moazzami
*Assistant Examiner*—David Garcia Cervetti (57) ABSTRACT

A system for supporting management operations associated with an interconnect device includes a port of the interconnect device to maintain authentication data that facilitates authorization of a management operation and a configuration switch coupled to the port to generate a reset signal in response to an operator's command. The port is operable to reset the authentication data upon receiving the reset signal from the configuration switch.

34 Claims, 8 Drawing Sheets

U.S. PATENT DOCUMENTS

| | | | |
|---|---|---|---|
| 2002/0078118 A1* | 6/2002 | Cone et al. | 709/101 |
| 2002/0087720 A1* | 7/2002 | Davis et al. | 709/238 |
| 2002/0124117 A1* | 9/2002 | Beukema et al. | 709/314 |
| 2002/0150049 A1* | 10/2002 | Collier et al. | 370/236 |
| 2002/0159385 A1* | 10/2002 | Susnow et al. | 370/229 |
| 2002/0172195 A1* | 11/2002 | Pekkala et al. | 370/360 |
| 2002/0188711 A1* | 12/2002 | Meyer et al. | 709/223 |
| 2003/0005039 A1* | 1/2003 | Craddock et al. | 709/203 |
| 2003/0014544 A1* | 1/2003 | Pettey | 709/249 |
| 2003/0018761 A1* | 1/2003 | Doyle et al. | 709/223 |
| 2003/0038842 A1* | 2/2003 | Peck et al. | 345/763 |
| 2003/0065733 A1* | 4/2003 | Pecone | 709/211 |
| 2003/0079019 A1* | 4/2003 | Lolayekar et al. | 709/226 |
| 2003/0112805 A1* | 6/2003 | Stanton | 370/395.1 |
| 2003/0120852 A1* | 6/2003 | McConnell et al. | 710/316 |
| 2003/0126283 A1* | 7/2003 | Prakash et al. | 709/238 |
| 2003/0192032 A1* | 10/2003 | Andrade et al. | 717/124 |
| 2005/0102557 A1* | 5/2005 | Davies et al. | 714/11 |
| 2005/0246568 A1* | 11/2005 | Davies | 714/2 |

OTHER PUBLICATIONS

IBM, IBM Infiniband Solutions, Jun. 2001, <http://web.archive.org/web/20010428221825/www.chips.ibm.com/products/infiniband/>.*

Yehuda Peled and Gene Risi, InfiniBand™—IBM Perspective and Products, First Quarter 2001, vol. 7, No. 1, MicroNews, w <http://web.archive.org/web/20011005032947/www.chips.ibm.com/micronews/vol7_no1/peled.html>.*

Infiniband Trade Association, Infiniband Architecture Specification vol. 1, Release 1.0.a, Jun. 2001, chapters 1-3, 9, 11, 14-15.*

Pfister, G.F., Aspects of the InfiniBand architecture, Oct. 2001, IEEE, International Conference on Cluster Computing, pp. 369-371.*

Voruganti et al., An analysis of three gigabit networking protocols for storage area networks, Apr. 2001, IEEE, International Conference on Performance, Computing, and Communications, pp. 259-265.*

Khoury et al., High speed serial transceivers for data communication systems, Jul. 2001, IEEE, Communications Magazine, vol. 39, Issue 7, pp. 160-165.*

Sancho et al., Effective strategy to compute forwarding tables for infiniBand networks, Sep. 2001, IEEE, International Conference on Parallel Processing, pp. 48-57.*

Infiniband Trade Association, Infiniband Architecture Specification vol. 1, Release 1.0.a, Jun. 2001.*

Infiniband Trade Association, Infiniband Architecture Specification vol. 2, Release 1.0.a, Jun. 2001.*

"InfiniBand Switch Chip Runs at 10 Gbps On Eight Ports", Nicholas Cravotta, Nov. 8, 2001, EDN, 1 page.

"Assemble Fast Switch Fabrics With 32-Port InfiniBand Node p. 60", Electronic Design, Oct. 15, 2001, 4 pages.

"RedSwitch, Inc. Announces Industry's Highest Performance and Highest Integration InfiniBand Switch Chip", RedSwitch Press Release, Oct. 16, 2001, 2 pages.

"RedSwitch Gearing Up To Launch New Chip", Steve Tanner, Silicon Valley Business Ink, Oct. 26, 2001, 3 pages.

"Mellanox Integrates Serdes Into Infiniband Switch", Jerry Ascierto, EE Times, Oct. 23, 2001, 3 pages.

"Switch Chip Expands InfiniBand Integration", EEM File 3130, Tony Chance, 2 pages.

"RedSwitch Announces 16 Gbyte/s Throughout Switch Product for RapidIO Architecture", RedSwitch Press Release, Milpitas, Calif., May 15, 2001, Tony Chance,May 15, 2001 , 2 pages.

"RedSwitch and Agilent Technologies Unveil 160-GB/s Throughout Switch Product for InfiniBand Architecture", RedSwitch Press Release, Intel Developer Forum Conference, San Jose, Calif., Feb. 27, 2001, Mark Alden-Agilent, Tony Chance-RedSwitch, 2 pages.

* cited by examiner

| bits words (no CRH) | 31-24 | 23-16 | 15-8 | 7-0 |
|---|---|---|---|---|
| 0 | VL  LVer | (SL) (rsv) LNH | DLID | |
| 1 | (resv 5) | PktLen | SLID | |
| 2 | IP Vers | (Traffic Class) | (Flow Label) | |
| 3 | PayLen | | NxtHdr | HopLmt |
| 4 | Source Address_1) S_GID1 | | | |
| 5 | Source Address_2) S_GID2 | | | |
| 6 | Source Address_3) S_GID3 | | | |
| 7 | Source Address_4) S_GID4 | | | |
| 8 | DGID_1 | | | |
| 9 | DGID_2 | | | |
| 10 | DGID_3 | | | |
| 11 | DGID_4 | | | |
| 12(2) | OpCode | (s)(r) PadC TVer | PKey | |
| 13(3) | (resv8a (variant)) | DQP  406 | | |
| 14(4) | (resv 7) | (PSN) | | |
| 15(5) | QKey | | | |
| 16(6) | (resv) | 408 | | 410 |
| 17(7) | Base Version | MgmtClass | Class Version | R Method |
| 18(8) | D (Status) | | HopPointer | HopCount |
| 19(9) | (Transaction_ID_1) | | | |
| 20(10) | 412 (Transaction_ID_2) | | | |
| 21(11) | Attribute ID | | (Reserved 1 or 2) | (Reserved 1 or 2) |
| 22(12) | Attribute Modifier  414 | | | |
| 23(13) | MKey/BKey_1  416 | | | |
| 24(14) | MKey_2/BKey_2 | | | |
| 25(15) | DrSLID | | DrDLID | |
| ... | (MAD Data) | | | |
| 80(70) | (MAD Data) | | | |
| 81(71) | ICRC | | | |

LRH, GRH, BTH, DETH, MAD

CONTROL OF AUTHENTICATION DATA RESIDING IN A NETWORK DEVICE

FIELD OF THE INVENTION

The present invention relates generally to the field of data communications and, more specifically, to controlling authentication data residing in a interconnect device.

BACKGROUND OF THE INVENTION

Existing networking and interconnect technologies have failed to keep pace with the development of computer systems, resulting in increased burdens being imposed upon data servers, application processing and enterprise computing. This problem has been exasperated by the popular success of the Internet. A number of computing technologies implemented to meet computing demands (e.g., clustering, fail-safe and 24×7 availability) require increased capacity to move data between processing nodes (e.g., servers), as well as within a processing node between, for example, a Central Processing Unit (CPU) and Input/Output (I/O) devices.

Figure 1:
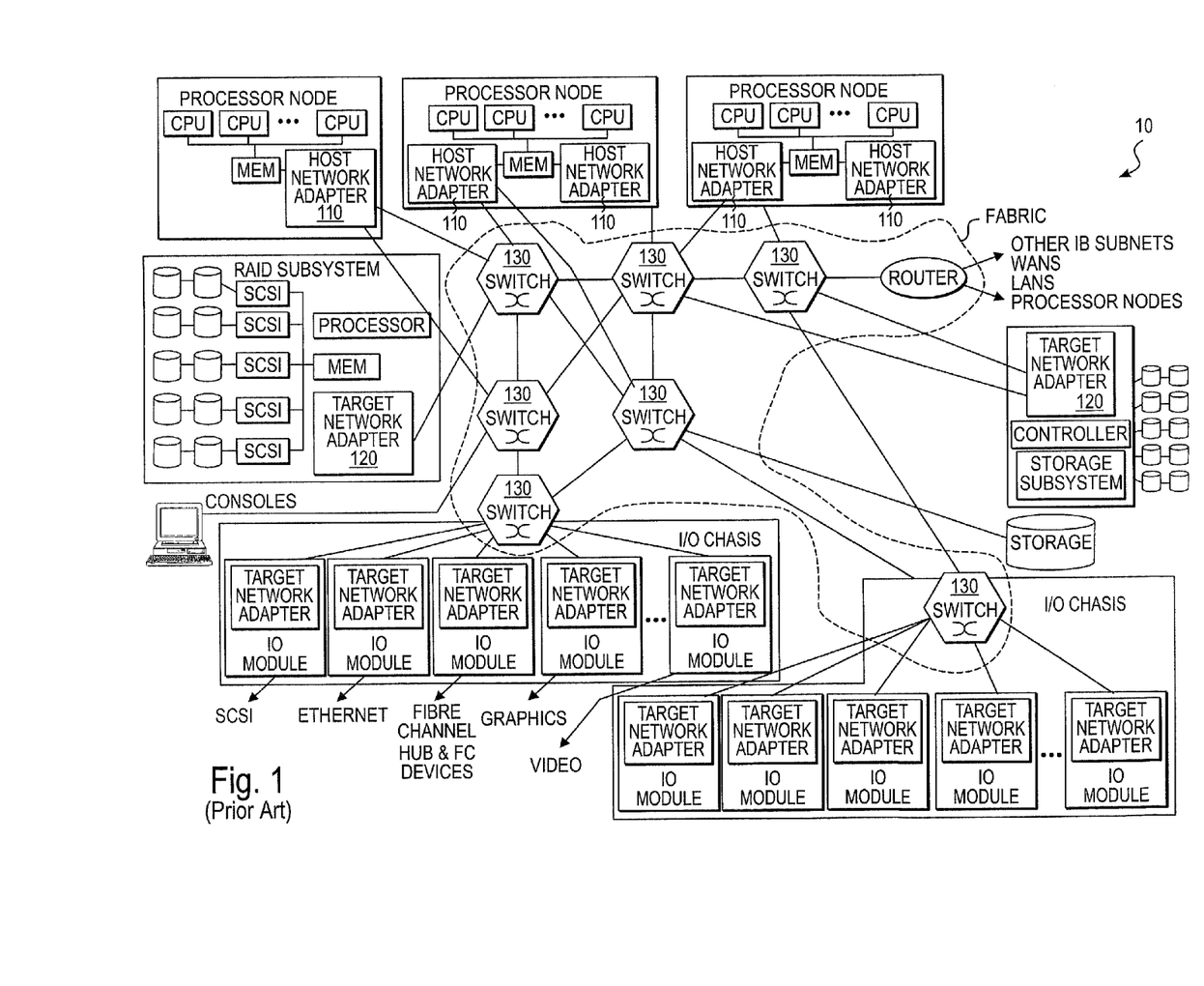
FIG. 1 is a diagrammatic representation of a System Area Network, according to the prior art, as supported by a switch fabric.

With a view to meeting the above described challenges, a new interconnect technology, called the InfiniBand™, has been proposed for interconnecting processing nodes and I/O nodes to form a System Area Network (SAN). This architecture has been designed to be independent of a host Operating System (OS) and processor platform. The InfiniBand™ Architecture (IBA) is centered around a point-to-point, switched internet protocol (IP) fabric whereby end node devices (e.g., inexpensive I/O devices such as a single chip Small Computer System Interface (SCSI) or Ethernet adapter, or a complex computer system) may be interconnected utilizing a cascade of switch devices. The InfiniBand™ Architecture is defined in the InfiniBand™ Architecture Specification Volume 1, Release 1.0, released Oct. 24, 2000 by the InfiniBand Trade Association. The IBA supports a range of applications ranging from back plane interconnect of a single host, to complex system area networks, as illustrated in FIG. 1 (prior art). In a single host environment, each IBA switched fabric may serve as a private I/O interconnect for the host providing connectivity between a CPU and a number of I/O modules. When deployed to support a complex system area network, multiple IBA switch fabrics may be utilized to interconnect numerous hosts and various I/O units.

Within a switch fabric supporting a System Area Network as indicated in 10, such as that shown in FIG. 1, there may be a number of devices having multiple input and output ports through which data (e.g., packets) is directed from a source device to a destination device. Such devices include, for example, switches 130, routers, repeaters and adapters 110 and 120 (exemplary interconnect devices). In addition to multiple communication ports directing external data packets, an interconnect device such as a switch typically includes a management port. Each sub-network (subnet) is managed by at least one Subnet Manager. A Subnet Manager resides either on an endnode or on an interconnect device and can be implemented either in hardware or software. The Subnet Manager performs its managing functions by communicating with the management port using InfiniBand™ Subnet Management Packets.

Subnet Management Packets (SMPs) are used to initialize and configure switches and other interconnect devices, and are therefore considered to participate in privileged operations. As a result, a mechanism is provided to authorize subnet management operations by comparing authentication data included in a SMP with authentication data stored in a destination port. The authentication data includes a Management Key (e.g., the InfiniBand™ Management Key). The Management Key is associated with several attributes that may affect the authorization of subnet management operations. For example, these attributes may include a protection attribute that identifies levels of protection required for specific subnet management operations and an expiration attribute that allows the management key to "expire" if the management key is lost. The expiration of the management key attribute is not permitted if the expiration attribute is set to zero. Accordingly, a problem may arise when the management key is lost or becomes contaminated while the expiration attribute is equal to zero.

SUMMARY OF THE INVENTION

Methods and systems for supporting management operations associated with an interconnect device are described. According to one aspect of the present invention, an exemplary system includes a port of the interconnect device to maintain authentication data that facilitates authorization of a management operation and a configuration switch coupled to the port to generate a reset signal in response to an operator's command. The port is operable to reset the authentication data upon receiving the reset signal from the configuration switch.

According to another aspect of the present invention, an exemplary method includes detecting that a reset of authentication data maintained by a management port of an interconnect device is necessary, informing the operator that the reset is required and refraining from sending subnet management packets (SMPs) to the management port until receiving a message from the operator indicating that the authentication data maintained by the management port has been reset. The method further includes sending to the management port an update SMP that includes a request to set authentication data residing in each unit of the interconnect device to a specific update value.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Methods and systems to support management operations associated with an interconnect device are described. In the following description, for purposes of explanation, numerous specific details are set forth in order to provide a thorough understanding of the present invention. It will be evident, however, to one skilled in the art that the present invention may be practiced without these specific details.

Note also that embodiments of the present description may be implemented no only within a physical circuit (e.g., on semiconductor chip) but also within machine-readable media. For example, the circuits and designs discussed above may be stored upon and/or embedded within machine-readable media associated with a design tool used for designing semiconductor devices. Examples include a netlist formatted in the Very High Speed Integrated Circuit (VHSIC), Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

For the purposes of the present invention, the term "interconnect device" shall be taken to include switches, routers, repeaters, adapters, or any other device that provides interconnect functionality between nodes. Such interconnect functionality may be, for example, module-to-module or chassis-to-chassis interconnect functionality. While an exemplary embodiment of the present invention is described below as being implemented within a switch deployed within an InfiniBand architectured system, the teachings of the present invention may be applied to any interconnect device within any interconnect architecture.

Figure 2:
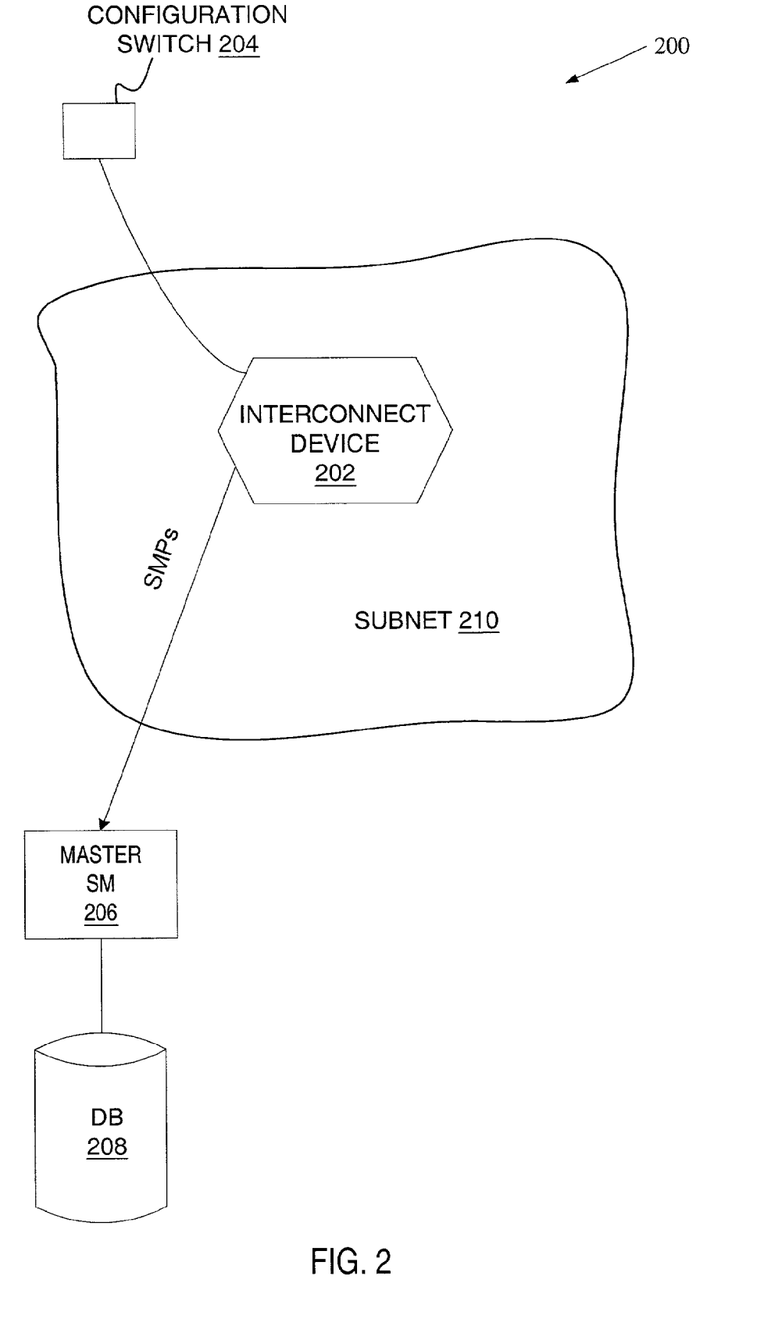
FIG. 2 is a block diagram of a system for supporting management operations associated with an interconnect device, according to one embodiment of the present invention.

FIG. 2 is a block diagram of a system 200 for supporting management operations associated with an interconnect device, according to one embodiment of the present invention. System 200 includes a sub-network (subnet) 210 and a subnet manager 206 coupled to subnet 210 that configures and manages subnet 210. Subnet 210 includes one or more interconnect devices 202 such as switches, routers, repeaters, adapters, etc. Subnet manager 206 communicates with each interconnect device 202 to perform managing functions which include, for example, initialization and configuration of interconnect device 202. The communication between subnet manager 206 and interconnect device 202 is accomplished using data packets designated to perform managing operations. In one embodiment, these data packets are InfiniBand™ Subnet Management Packets as will be described in more detail below.

Because the data packets sent by subnet manager 206 participate in privileged operations, an authorization mechanism is provided to prevent unauthorized entities from performing such operations. The authorization mechanism may be supported by subnet manager 206 which places authentication data in interconnect device 202 during its configuration and also stores the authentication data in a subnet manager database 208. Subsequently, when creating a data packet with a request to perform a managing operation, subnet manager 206 retrieves the authentication data associated with interconnect device 202 from database 208 and includes this authentication data into the data packet. Once interconnect device 202 receives the data packet from subnet manager 206, interconnect device 202 compares the authentication data included in the data packet with the authentication data stored locally in interconnect device 202 to determine whether the data packet was sent by an authorized entity. If both data items match (or the authentication data residing in the interconnect device 202 is set to a value that does not require an authentication check), interconnect device 202 performs the operation requested by the data packet and sends a response back to subnet manager 206. Alternatively, if a mismatch of the data items occurs, interconnect device 202 discards the data packet without sending any response back.

In some situations, the authentication data associated with interconnect device 202 may be lost. For example, a failure of subnet manager 206 may occur before subnet manager 206 shares the authentication data with a successor (e.g., a backup subnet manager). In this situation, a conventional approach for recovering the authentication data is based on an expiration attribute associated with the authentication data. Specifically, when the value of the expiration attribute permits, the authentication data residing in interconnect device 202 can expire, thereby returning interconnect device 202 into a state that allows the successor of interconnect device 202 to establish new authentication data. However, some values of the expiration attribute provide for the indefinite duration of the authentication data, i.e., they do not allow the authentication data to expire. As a result, if a violation of the authentication data occurs at the time when its expiration is not permitted, subnet manager 206 or its successor can no longer manage interconnect device 202.

The present invention provides a mechanism that allows subnet manager 206 or any other authorized entity to regain control over interconnect device 202 at any time. Specifically, a configuration switch 204 is provided which is responsible for receiving an operator's command to reset the authentication data stored in interconnect device 2020 and generating a reset signal in response to the operator's command. Interconnect device 202 receives the reset signal from configuration switch 204 and resets the authentication data, thereby returning interconnect device 202 into a state that allows subnet manager 206 or any other authorized entity to establish new authentication data within interconnect device 202. In one embodiment, the configuration switch 204 includes a pin located outside of interconnect device 202. A change of the pin's state (i.e., the pin is being either set or cleared) causes a generation of a reset signal.

In one embodiment, configuration switch 204 is coupled to each interconnect device within subnet 210. Alternatively, a separate configuration switch is provided for each interconnect device within subnet 210.

Figure 3:
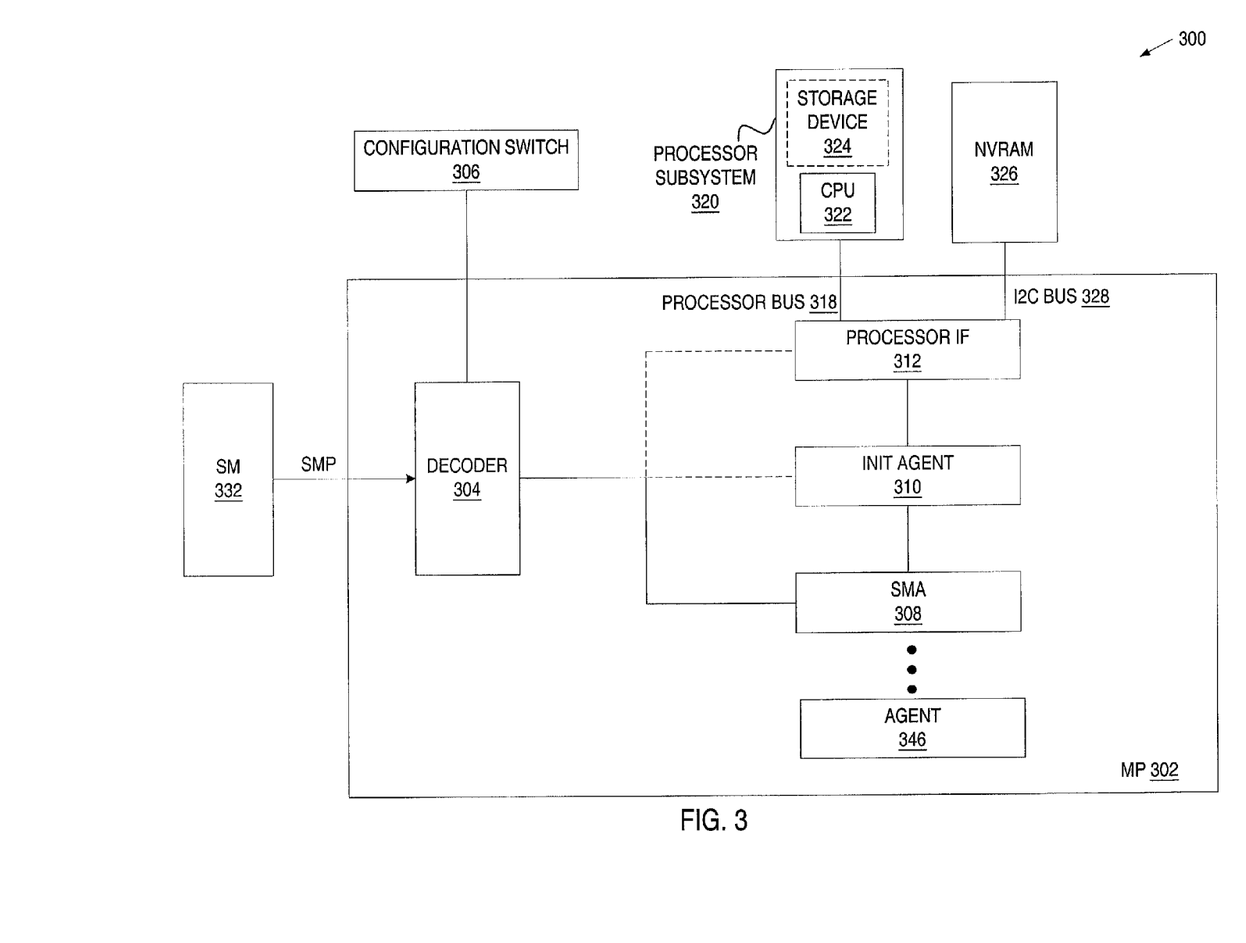
FIG. 3 is a block diagram of a system for maintaining authentication data in a management port of an interconnect device, according to one embodiment of the present invention.

In one embodiment, configuration switch 204 is coupled to a management port of interconnect device 202 that stores multiple copies of authenticated data. FIG. 3 is a block diagram of a system 300 for maintaining authentication data in a management port of an interconnect device, according to one embodiment of the present invention.

Referring to FIG. 3, management port 302 includes a set of agents that perform various functions. One of the agents is an initialization agent 310 that is responsible for controlling the initialization of the interconnect device. Initialization agent 310 stores authentication data and a set of associated attributes. In one embodiment, the authentication data consists of a management key (e.g., an InfiniBand™ M_Key), and the associated attributes include a management key protection attribute (e.g., InfiniBand™ M_KeyProtectBits) and an expiration attribute (e.g., InfiniBand™ M_KeyLeasePeriod). The protection attribute defines levels of protection for operations requested by subnet manager 332. The expiration attribute allows the management key to expire when the management key is lost or contaminated. Initialization agent 310 knows which units within the interconnect device store authentication data and communicates with these units when the update of the authentication data is requested.

Another agent residing in management port 302 is a processor subsystem interface 312. The processor subsystem interface 312 is coupled to a processor subsystem 320 via a processor bus 318 and/or an independent non-volatile random access memory (NVRAM) 326 via a bus 328 (e.g., an Inter-IC (I2C) bus). Processor subsystem 320 includes a processor 322 and may or may not include a non-volatile storage device 324. Configuration information associated with the interconnect device may be stored either in NVRAM 326 or storage device 324. The configuration information includes a copy of the authentication data (e.g., the management key) and associated attributes (including the protection attribute and the expiration attribute). Processor subsystem interface 312 knows in which device the configuration information resides and requests the configuration information or its portions (e.g., the management key) from the appropriate storage device when needed.

Yet other agents residing in management port 302 include a decoder 304, subnet management agent (SMA) 308 and agent 346. Decoder 304 is responsible for decoding and dispatching data packets received at management port 302 to destination agents within management port 302. SMA 308, and agent 346 are targeting destination agents for subnet management packets (SMPs) sent by a subnet manager 332. Each of decoder 304, SMA 308, and agent 346 includes a copy of the management key and associated attributes. When decoder 304 determines that a data packet being decoded is a SNP, decoder 304 compares its copy of the management key with the management key included in the packet. If the two management keys match, decoder 304 forwards the SMP to SMA 308. Otherwise, decoder 304 discards the SNP. This authentication check is not performed when the decoder's copy of the management key is set to zero.

In one embodiment, a configuration switch 306 is coupled to decoder 304 to allow a reset of the decoder's copy of the management key when needed. For example, the mismatch between the decoder's management key and the management key included in a SMP may be unintended and caused by malfunctioning of the interconnect device and/or subnet manager 332. Then, an operator can issue a command to reset the management key (e.g., by pushing a button associated with switch 306). In one embodiment, subnet manager 332 informs the operator (e.g., via any visual or audible means) that the reset of the management key is needed. In another embodiment, the interconnect device itself may be operable to inform the operator that the reset is required. In yet another embodiment, the operator can issue the reset command via configuration switch 306 without any notification from the interconnect device or subnet manager 332 (e.g., the reset may be a part of installation of the interconnect device).

Configuration switch 306 responds to the operator's command by generating a reset signal that causes decoder 304 to "zap" (i.e., to set to zero) its copy of the management key. While the decoder's copy of the management key is equal to zero, no authentication check will be performed for SMPs received at management port 302, thus allowing the communication between subnet manager 332 and SMA 308 to resume.

In one embodiment, once decoder 304 receives the reset signal, it resets its copy of the management key and forwards the reset signal to initialization agent 310, which in turn resets its management key and sends a request to reset a copy of the management key to each component of the interconnect device that stores such a copy. In another embodiment, decoder 304 only resets its copy of the management key and does not communicate the reset signal to other agents of management port 302.

In one embodiment, subnet manager 332 receives a resume command from the operator once the decoder's management key is reset. The resume command indicates that the communication between subnet manager 332 and management port 302 can be resumed. In response to the resume command, subnet manager 332 sends a new SMP to management port 302 with a request to update the management key residing in management port 302 to the value of the management key that is stored in the subnet manager's database. This process will be described in greater detail below.

Figure 4:
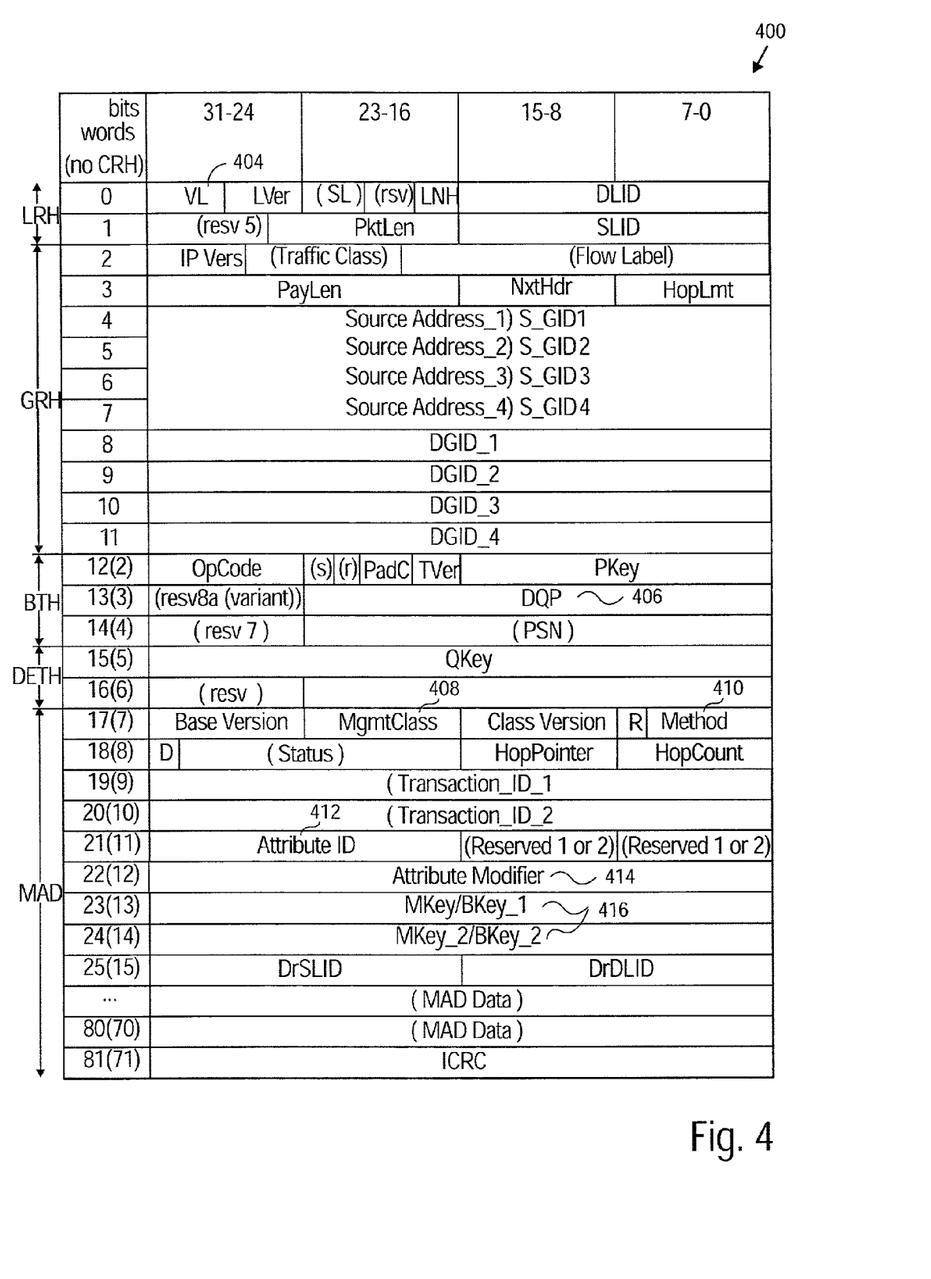
FIG. 4 is an exemplary datagram of a Subnet Management Packet (SMP) received by a decoder of FIG. 3, according to one embodiment of the present invention.

FIG. 4 is an exemplary datagram 400 of a SMP received by decoder 302 of FIG. 3, according to one embodiment of the present invention.

Referring to FIG. 4, the positions of each field within the packets is provided in bits words. When there are two numbers, the number in parenthesis is given for a packet without a global router header (GRH), and the other number is given for a packet that includes a GRH.

Decoder 302 determines whether the packet is a SMP using a virtual lane (VL) identifier 404 and a destination queue pair (DQP) identifier 406. VL identifier 404 specifies whether this packet is a VL 15 packet or a non-VL 15 packet. VLs are, in one embodiment, independent data streams that are supported by a common physical link. A VL may represent a set of transmit and receive buffers in a port. VL15 is reserved exclusively for subnet management packets (SMPs). DQP identifier 406 identifies a target destination queue pair. A queue pair is used to queue up a set of instructions that the hardware executes. A queue pair consists of a queue for send operations and a queue for receive operations. VL 15 packets must use queue pair 0 and non-VL 15 packets can use any other queue pairs except queue pair 0. Further details regarding the concepts of "virtual lanes" and "queue pairs" are provided in the InfiniBand™ Architecture Specification, Volume 1, Oct. 24, 2000.

Decoder 304 decides that the packet is a SMP if VL identifier 404 is equal to fifteen and DQP identifier 406 is equal to zero. A management class 408 identifies a particular agent that should process the packet. For a SMP, management class 408 stores the value associated with a SMA. A method 410 identifies an operation (e.g., read or write) requested by the packet. An attribute identifier 412 and an attribute modifier 414 are used to identify the location of the requested operation. M_Key fields 416 store a 64-bit management key that needs to be compared with the decoder's copy of the management key to authenticate the SMP at the management port.

It should be noted that various other fields in the packet can be used to extract the information required by system 300. In addition, incoming packets may have a variety of other formats and fields that decoder 304 may use to extract the required information.

Figure 5:
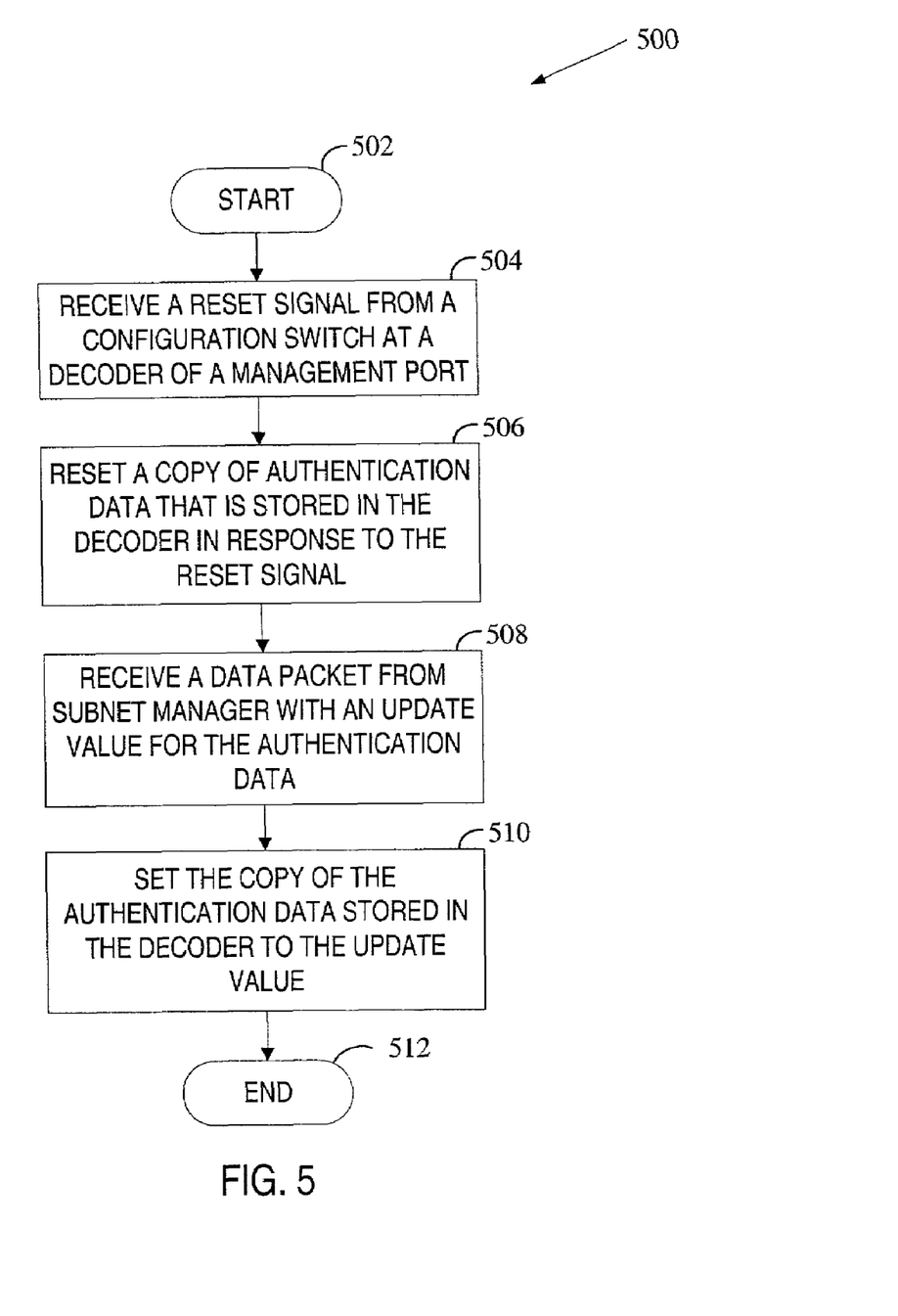
FIG. 5 is a flow diagram of a method for controlling authentication data residing in an interconnect device, according to one embodiment of the present invention.

FIG. 5 is a flow diagram of a method 500 for controlling authentication data residing in an interconnect device, according to one embodiment of the present invention. Method 500 is performed by processing logic, which may comprise hardware, software, or a combination of both. The processing logic of method 500 is implemented in a management port of the interconnect device (e.g., in decoder 304 of FIG. 3).

Method 500 beings at block 502 with the processing logic receiving a reset signal from a configuration switch coupled to the management port (processing block 504). The reset signal indicates that an operator has requested to reset authentication data stored in a decoder of the management port. As described in more detail above, the authentication data facilitates the authorization of management operations associated with the interconnect device. In one embodiment, the authentication data is represented as a management key.

At processing block 506, the processing logic resets the decoder's copy of the authentication data. Because no authentication of an incoming data packet is performed when the authentication data is set to zero, the reset of the decoder's copy of the authentication data allows a subnet manager to communicate with the management port when their authentication data does not match.

Next, at processing block 508, the processing logic receives a data packet from the subnet manager that includes a request to update the authentication data residing in the interconnect device with a new value that matches the value of the management key maintained by the subnet manager. In one embodiment, prior to receiving the data packet with the request to update the authentication data, the processing logic receives the subnet manager's data packet with a request to read the authentication data residing in the management port. The processing logic decodes this data packet and sends it to a subnet management agent (SMA) residing in the management port. The SMA reads the authentication data maintained by the initialization agent, generates a response including this authentication data and sends the response to the subnet manager. The subnet manager may then use this authentication data as an update value in the subsequent data packet that includes the update request.

Afterwards, at processing block 510, the processing logic sets the decoder's copy of the management key to the new value. In one embodiment, the update of the decoder's copy of the management key is performed upon receiving an update request from an initialization agent of the management key. Specifically, once the decoder receives a valid data packet from the subnet manager, it decodes the data packet and sends the data packet to a subnet management agent (SMA) residing in the management port. The SMA determines that the data packet includes a request to update the authentication data, updates its copy of the authentication data, and notifies the initialization agent about this request. The initialization agent updates its own authentication data and sends a command to update a corresponding copy of the authentication data to each unit of the interconnect device that stores such a copy, including the decoder. As a result, the mismatch between the authentication data maintained by the subnet manager and the authentication data maintained by the interconnect device is corrected, and normal authentication operations can resume. The method ends at block 512.

Figure 6:
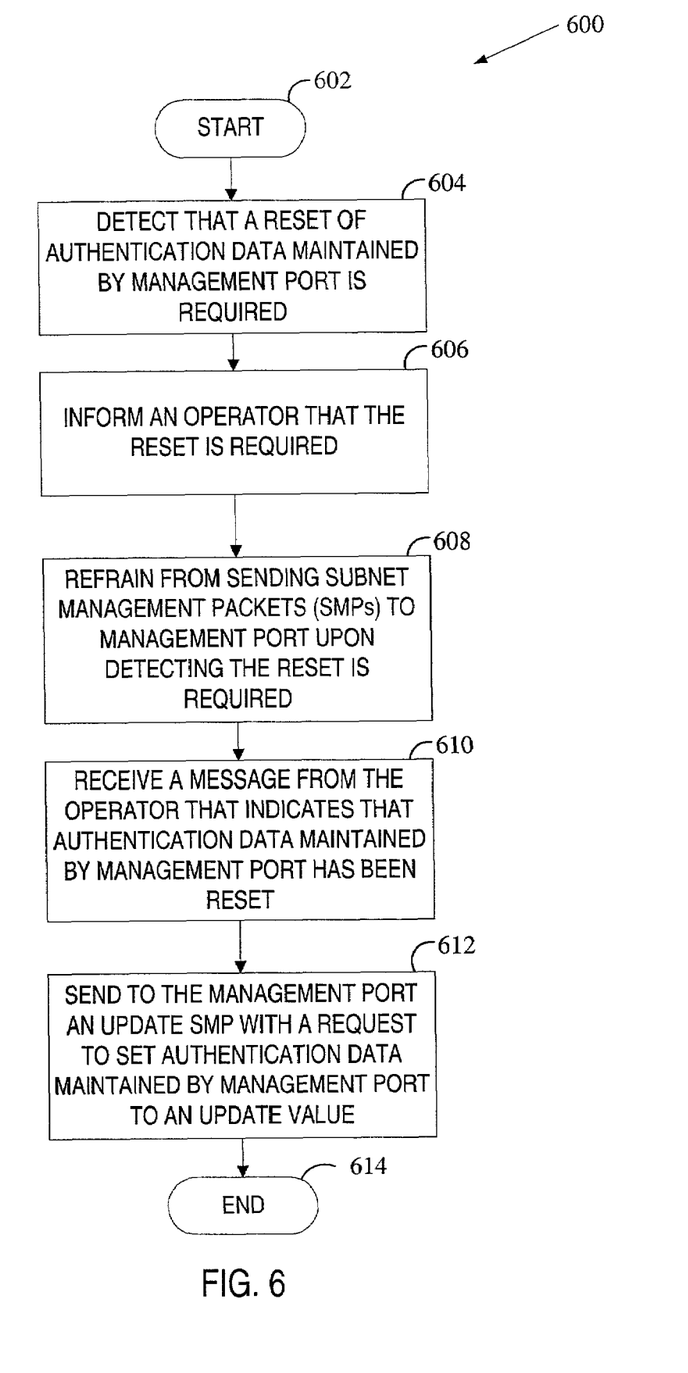
FIG. 6 is a flow diagram of a method for supporting management operations associated with an interconnect device, according to one embodiment of the present invention.

FIG. 6 is a flow diagram of a method 600 for supporting management operations associated with an interconnect device, according to one embodiment of the present invention. Method 600 is performed by processing logic, which may comprise hardware, software, or a combination of both. The processing logic of method 500 is implemented in a subnet manager such as a subnet manager 206 of FIG. 2.

Method 600 begins at block 602 with the processing logic detecting that a reset of authentication data (e.g., a management key) maintained by a management port of the interconnect device is required (processing block 604). In one embodiment, the reset requirement is detected upon receiving a trap indicating that the management port has invalidated an initial data packet (e.g., a SMP) sent to the management port by the subnet manager due to a violation of the authentication data. In one embodiment, the trap is issued when the management port detects a mismatch between the authentication data stored in the management port and the authentication data included in the initial data packet, and an expiration attribute associated with the authentication data is set to the value (e.g., a zero) that prevents the expiration of the authentication data as explained in greater detail above.

In another embodiment, the reset requirement is detected in response to the following sequence of events:
  (a) the initial data packet is sent to the management port;
  (b) no response to the initial packet is received from the management port for a predefined time period; and
  (c) the initial data packet is re-sent a predetermined number of times without receiving any response from the management port.

Based on this sequence of events, the processing logic decides that the failure of the management port to respond is probably caused by the violation of the authentication data.

It should be noted that any other mechanism known in the art can be used to allow the subnet manager to detect the violation of the authentication data.

Next, at processing block 606, the processing logic notifies the operator that the reset is required. The notification may be in any visual form (e.g., a message on a display device, a red light of an LED, etc.) or audio form (e.g., a particular sound, a sequence of sounds, etc.).

Once the processing logic determines that the reset is required, it prevents the transmission of data packets to the management port (processing logic 608) until receiving a message from the operator that indicates that the authentication data maintained by the management port has been reset (processing block 610). Subsequent to the operators' message, the processing logic sends to the management port an update data packet with a request to set the authentication data maintained by the interconnect device to an update value (processing block 612). In one embodiment, the update value is the value stored in a database of the subnet manager. In another embodiment, prior to sending the update data packet, the processing logic determines the update value. In this embodiment, the operator's reset command causes only the reset of the decoder's copy of the authentication data; other agents of the management port still store valid authentication data, as described in greater detail above. In this embodiment, once the processing logic receives the operator's message indicating that the reset has been performed, the processing logic sends to the management port a read data packet requesting the current value of the authentication data maintained by the management port. In one embodiment, this data packet is processed by the SMA of the management port that queries the initialization agent for the current value of the authentication data and sends a response with this value back to the subnet manager. The processing logic then updates the database of the subnet manager with the received value of the authentication data and also uses this value as an update value in the update data packet that is sent to the management port at processing block 612. The method ends at block 614.

Figure 7A:
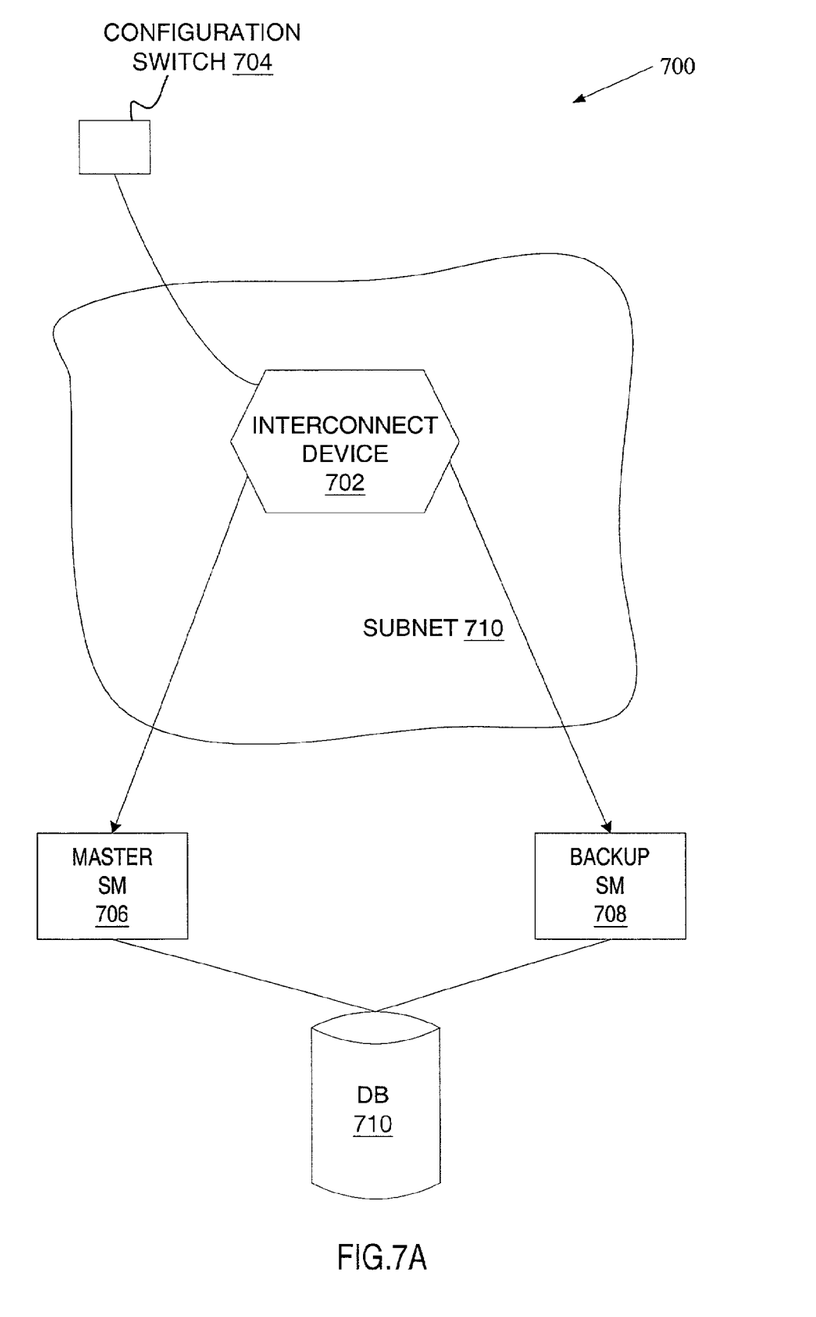
FIGS. 7A and 7B illustrate the operation of some embodiments of the present invention using two exemplary scenarios.
Figure 7B:
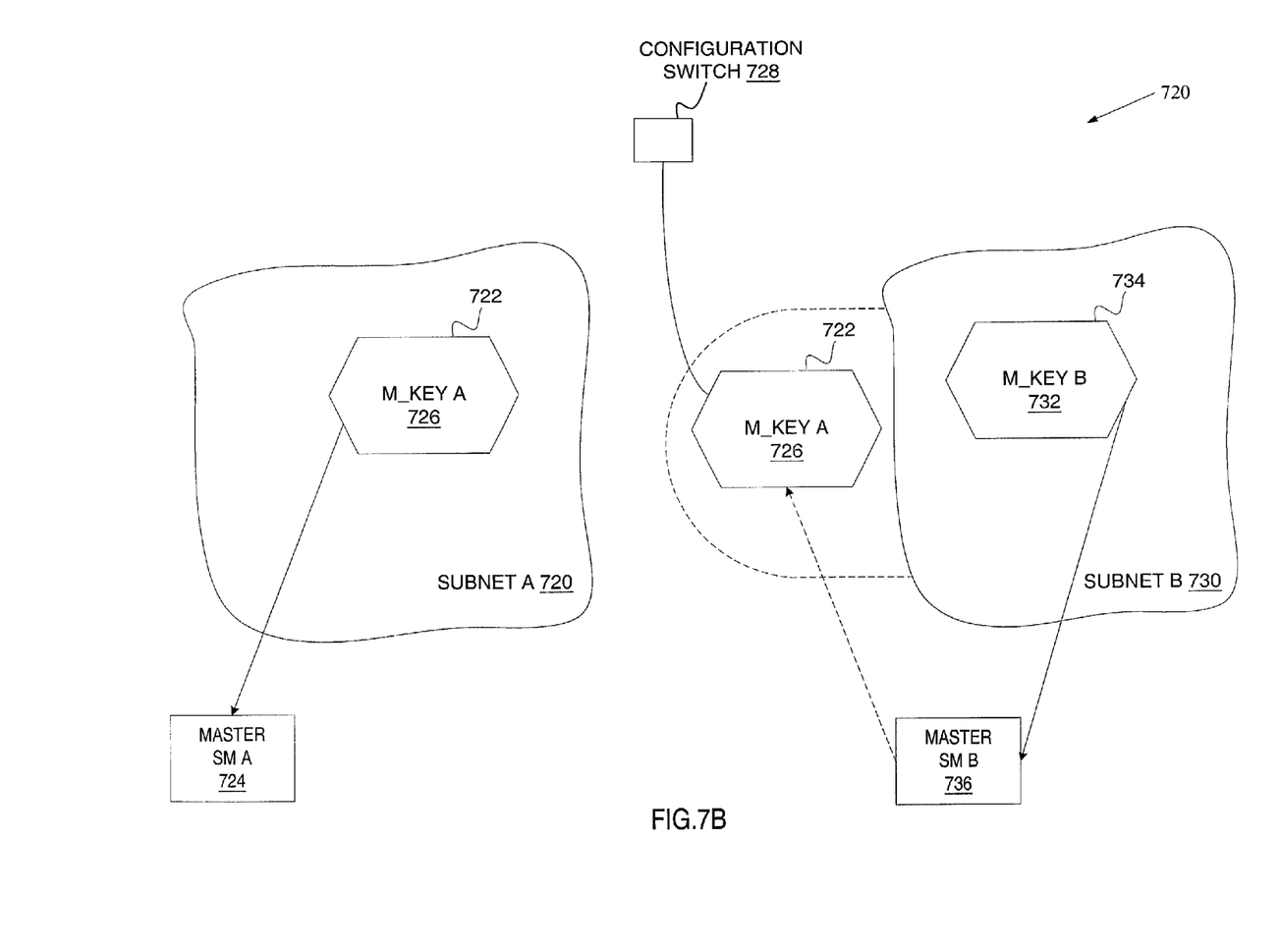

FIGS. 7A and 7B illustrate the operation of some embodiments of the present invention using two exemplary scenarios shown at 700 and 720.

Referring to FIG. 7A, a master subnet manager 706 manages subnet 710 that includes an interconnect device 702. Master subnet manager 706 performs its managing functions by communicating with a SMA that resides in a management port of interconnect device 702 using SMPs. As described above, each SMP includes a management key that is compared with a management key stored in a decoder of the management port unless the decoder's management key is set to zero.

The management key is stored in the management port with a set of associated attributes including an expiration attribute. The expiration attributes facilitates the expiration of the management key. For example, according to the InfiniBand™ Architecture, if the management key included in the SMP does not match the management key stored in the decoder, the expiration attribute (referred to as "M_Key-LeasePeriod") gets set to a certain time period at the end of which the management key will expire. Accordingly, although the current SMP that includes the mismatched management key is discarded, an SMP received at the management port at a later time (after the management key has expired) will not undergo the authentication check and will be processed by the SMA as a valid SMP. This approach allows the recovery of the management key when the management key is lost or contaminated. However, this approach is used only if the expiration attribute is not equal to zero because the expiration of the management key is not permitted when the expiration attribute is set to zero.

Master subnet manager 706 maintains a database 710 where the management key associated with interconnect device 702 is stored. When master subnet manager 706 inadvertently goes away, a transition to a backup subnet manager 708 takes place. During this transition, the correct management key may be lost (e.g., database 710 may be lost or its data may be contaminated), leaving backup subnet manager 708 with an incorrect management key. Subsequently, when backup subnet manager 708 sends an SMP to the SMA of the management port, the authentication check performed by the decoder will fail. If at this time, the expiration attribute is set to zero at this time, backup subnet manager 708 will detect that the management key is violated using one of the mechanisms described above and will notify the operator that the reset of the management key residing in the management port is needed. The operator will then send a reset command to the management port via a configuration switch 704.

In addition to the reset command, the operator will submit a message to backup subnet manager 708 (e.g., by pushing a corresponding button) indicating that the reset of the management key has been completed. In response, backup subnet manager 708 will recover the management key using one of the approaches described above.

Referring to FIG. 7B, subnet 730 includes interconnect device 734 with associated management key 732. The size of subnet 730 is increased by adding an interconnect device 722 initially included in subnet 720. The management key associated with interconnect device 722 is known to a subnet manager 724 but not a subnet manager 736. In one embodiment, to avoid the mismatch of management keys, the installation procedure requires the operator performing the addition to interconnect device 722 to subnet 730 to reset the management key 726 using a configuration switch 728. In another embodiment, the installation procedure does not require the reset of the management key. Instead, subnet manager 736 detects that such reset is required after the installation of interconnect device 726 is completed and notifies the operator about the reset requirement as described in greater detail above.

In one embodiment, a reset signal generated by configuration switch 728 will zap each management key stored in interconnect device 726. Alternatively, a reset signal generated by configuration switch 728 will only zap the management key of the decoder. In either embodiment, once subnet manager 736 receives a message indicating that the reset of the management key has been performed, subnet manager 736 sends an update SMP to set the management keys of interconnect device 726 to a desired value.

The scenarios illustrated in FIGS. 7A and 7B are based on the management key violations that were caused by external events (i.e., events that did not take place within the interconnect device). However, a management key violation may also occur due to an internal cause. For example, referring back to FIG. 3, in one embodiment, a processor bus 318 is 16-bit wide and an I2C bus 328 is 1-bit wide while the management key is 64-bit long. When subnet manager 332 requests an update of each management key within the interconnect device, the update of the management key stored either in NVRAM 326 or storage device 324 involves several operations (because only a portion of the update management key can be passed during one operation via a corresponding bus). If these operations are interrupted before they are completed (e.g., due to a reset or a malfunction), NVRAM 326 or storage device 324 will store an incorrect management key that may be passed to the other units of the interconnect device during a reboot, causing a mismatch between the management key maintained by the interconnect device and the management key maintained by subnet manager 332.

In another example, a contamination of the management key may happen when NVRAM 326 is switched to storage device 324 (or vice versa) due to a problem with NVRAM 326. If the management key stored in NVRAM 326 has been recently updated, storage device 324 may not store this current version of the management key but rather store a previous, old version of the management key. During a reboot, this old version of the management key may be passed to the other units of the interconnect device, causing a mismatch between the management key maintained by the interconnect device and the management key maintained by subnet manager 332.

In each of these two examples, if at the time the mismatch is detected, the expiration attribute is set to zero, the decoder's copy of the management key will need to be reset via configuration switch 306 to provide for the recovery of the management key as described in greater detail above.

Thus, methods and systems to support management operations associated with an interconnect device have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system to support management operations associated with an interconnect device, the system comprising:
   a configuration switch configured to receive an operator command to reset authentication data having associated thereto an expiration attribute set to a value providing for indefinite duration of the authentication data, wherein the authentication data facilitates authorization of the management operations from an operator, and configured to generate a reset signal in response to the operator command; and
   a port of the interconnect device coupled to the configuration switch, the port configured to maintain the authentication data and to reset the authentication data upon receiving the reset signal from the configuration switch.

2. The system of claim 1 wherein the port is configured to store the authenticated data together with a set of associated attributes.

3. The system of claim 2 wherein:
   the port is a management port;
   the authentication data is a management key; and
   the set of associated attributes includes a protection attribute specifying a level of protection required for performing a particular management operation and the expiration attribute controlling expiration of the management key.

4. The system of claim 3 further comprising:
   a sub-network (subnet) manager coupled to the interconnect device, the subnet manager configured to store a copy of the management key and to include the management key into a Subnet Management Packet (SMP) sent to the management port for a comparison with the management key stored in the management port.

5. The system of claim 3 wherein the management port comprises:
   an initialization module to store the authentication data;
   a decoder to store a first copy of the authentication data;
   a management agent to store a second copy of the authentication data; and
   a processor subsystem interface to provide access to a storage device that stores a third copy of the authentication data.

6. The system of claim 5 wherein the decoder is configured to receive the reset signal from the configuration switch.

7. The system of claim 6 wherein the decoder is configured to communicate the reset signal to any one of the initialization module, the management agent and the configuration interface.

8. A method to support management operations associated with an interconnect device, the method comprising:
   receiving a reset signal from a configuration switch at a decoder of a management port, the reset signal indicating that an operator requested a reset of an authentication data having associated thereto an expiration attribute set to a value providing for indefinite duration of the authentication data, wherein the authentication data facilitates authorization of the management operations; and
   resetting a copy of the authentication data, wherein the authentication data is stored in the decoder in response to the reset signal.

9. The method of claim 8 further comprising:
   receiving a management packet from a sub-network (subnet) manager with an update value for the authentication data; and
   setting the copy of the authentication data stored in the decoder to the update value.

10. The method of claim 8 further comprising:
    the decoder communicating the reset signal to any one of an initialization module, a management agent and a processor subsystem interface; and
    resetting a corresponding copy of the authentication data upon receiving the reset signal at any one of the initialization module, the management agent and the processor subsystem interface.

11. The method of claim 8 wherein the authentication data is a management key.

12. A method to support management operations associated with an interconnect device, the method comprising:
    detecting that a reset is required of authentication data having associated thereto an expiration attribute set to a value providing for indefinite duration of the authentication data, wherein the authentication data resides in a management port of the interconnect device;
    informing an operator that the reset is required;
    refraining from sending subnet management packets (SMPs) to the management port upon detecting that the reset is required;
    receiving a message from the operator that indicates that the authentication data has been reset; and
    subsequent to the receipt of the message, sending to the management port an update SMP with a request to set authentication data residing in each unit of the interconnect device to an update value.

13. The method of claim 12 wherein:
    the SMPs are virtual lane 15 (VL 15) packets; and
    the authentication data is a management key.

14. The method of claim 12 wherein:
    each SMP sent to the management port includes authentication data that matches authentication data residing in a decoder of the management port unless the authentication data residing in the decoder is set to a predetermined value.

15. The method of claim 12 wherein the authentication data is stored in the management port with a set of associated attributes, the set of associated attributes including a protection attribute specifying a level of protection required for performing a particular management operation and the expiration attribute controlling expiration of the authentication data.

16. The method of claim 15 wherein detecting that the reset is required comprises:
    sending a SMP containing a copy of the authentication data maintained by the subnet manager to the management port; and
    receiving a trap indicating that the management port has invalidated the SMP due to a mismatch between the authentication data included the SMP and the authentication data maintained by the management port and further indicating that the expiration attribute is set to the value providing for indefinite duration of the authentication data and thereby preventing expiration of the authentication data.

17. The method of claim 15 wherein detecting that the reset is required comprises:
sending an initial SMP containing a copy of the authentication data maintained by the subnet manager to the management port;
determining that a response to the initial SMP has not been received from the management port for a predefined time period;
re-sending the initial SMP for a predetermined number of times without receiving a response; and
determining that the failure to receive the response may be caused by a mismatch between the authentication data included in the initial SMP and the authentication data maintained by the management port.

18. The method of claim 12 wherein the update value is the value of authentication data stored in a database of the subnet manager.

19. The method of claim 12 wherein the management port stores multiple copies of the authentication data; and
only one copy from the multiple copies has been reset in response to the operator command.

20. The method of claim 19 further comprising:
determining the update value for the update SMP.

21. The method of claim 20 wherein determining the update value comprises:
upon receiving the message indicating that the authentication data maintained by the management port has been reset, sending to the management port a read SMP requesting a current value of the authentication data maintained by the management port;
receiving the current value of the authentication data maintained by the management port from the management port;
designating the received value as the update value; and
updating authentication data in a database of the subnet manager with the received value.

22. An apparatus to support management operations associated with an interconnect device, the apparatus comprising:
means for detecting that a reset is required of authentication data having associated thereto an expiration attribute set to a value providing for indefinite duration of the authentication data, wherein the authentication data resides in a management port of the interconnect device;
means for informing an operator that the reset is required;
means for refraining from sending subnet management packets (SMPs) to the management port upon detecting that the reset is required;
means for receiving a message from the operator that indicates that the authentication data has been reset; and
means for sending to the management port an update SMP with a request to set authentication data residing in each unit of the interconnect device to an update value.

23. The apparatus of claim 22 wherein the SMPs are virtual lane 15 (VL 15) packets, and the authentication data is a management key.

24. The apparatus of claim 22 wherein each SMP sent to the management port includes authentication data that matches authentication data residing in a decoder of the management port unless the authentication data residing in the decoder is set to a predetermined value.

25. The apparatus of claim 22 wherein the authentication data is stored in the management port with a set of associated attributes, the set of associated attributes including a protection attribute specifying a level of protection required for performing a particular management operation and the expiration attribute controlling expiration of the authentication data.

26. A system comprising:
an interconnect device to maintain authentication data in a plurality of units, the authentication data facilitating management operations associated with the interconnect device;
a configuration switch coupled to the interconnect device, the configuration switch configured to reset authentication data having associated thereto an expiration attribute set to a value providing for indefinite duration of the authentication data, wherein the authentication data resides in a management port of the interconnect device; and
a sub-network (subnet) manager coupled to the interconnect device, the subnet manager configured to detect that the reset of authentication data residing in the management port is required, to inform an operator that the authentication data has been reset, and to send to the management port an update data packet with a request to set the authentication data residing in each of the plurality of units of the interconnect device to an update value.

27. The system of claim 26 wherein the subnet manager is configured to detect that the reset is required by sending a subnet manager packet (SMP) containing a copy of the authentication data maintained by the subnet manager to the management port, and receiving a trap indicating that the management port has invalidated the SMP due to a mismatch between the authentication data included the SMP and the authentication data maintained by the management port and further indicating that the expiration attribute is set to the value providing for indefinite duration of the authentication data and thereby preventing expiration of the authentication data.

28. The system of claim 26 wherein the subnet manager is configured to detect that the reset is required by sending an initial subnet management packet (SMP) containing a copy of the authentication data maintained by the subnet manager to the management port, determining that a response to the initial SMP has not been received from the management port for a predefined time period, re-sending the initial SMP for a predetermined number of times without receiving a response, and determining that the failure to receive the response may be caused by a mismatch between the authentication data included in the initial SMP and the authentication data maintained by the management port.

29. The system of claim 26 wherein the update value is the value of authentication data stored in a database of the subnet manager.

30. The system of claim 26 wherein the management port stores multiple copies of the authentication data, and only one copy from the multiple copies has been reset in response to the operator command.

31. The system of claim 30 wherein the subnet manager is configured to determine the update value for the authentication data.

32. The system of claim 31 wherein the subnet manager is configured to determine the update value by sending to the management port a read SMP requesting a current value of the authentication data maintained by the management port upon receiving a message indicating that the authentication data maintained by the management port has been reset, to receive the current value of the authentication data maintained by the management port from the management port, to designate the received value as the update value, and to update authentication data in a database of the subnet manager with the received value.

33. A machine-readable medium storing a description of a circuit comprising:
  a decoder configured to reset, based on a reset signal received from a configuration switch, an authentication data having associated thereto an expiration attribute set to a value providing for indefinite duration of the authentication data, wherein the authentication data is stored in the decoder and the decoder is configured to receive a management packet from the sub-network (subnet) manager with an update value for the authentication data residing in a plurality of units of an interconnect device; and
  a subnet management agent configured to receive the management packet from the decoder and to control the update of the authentication data residing in each of the plurality of units.

34. A computer readable storage medium storing executable instructions which when executed on a processing system causes said processing system to perform a method comprising:
  detecting that a reset is required of authentication data having associated thereto an expiration attribute set to a value providing for indefinite duration of the authentication data, wherein the authentication data resides in a management port of the interconnect device;
  informing an operator that the reset is required;
  refraining from sending subnet management packets (SMPs) to the management port upon detecting that the reset is required;
  receiving a message from the operator that indicates that the authentication data has been reset; and
  subsequent to the receipt of the message, sending to the management port an update SMP with a request to set authentication data residing in each unit of the interconnect device to an update value.

* * * * *